United States Patent [19]

Bac

[11] 4,335,905
[45] Jun. 22, 1982

[54] TANKS AND CONNECTING DUCTS THEREFOR

[75] Inventor: Jean-Claude Bac, Petit Quevilly, France

[73] Assignee: Pneumatiques Caoutchouc Manufacture et Plastiques Kleber-Colombes, Colombes, France

[21] Appl. No.: 144,829

[22] Filed: Apr. 29, 1980

[30] Foreign Application Priority Data

May 7, 1979 [FR] France .................................. 79 11538

[51] Int. Cl.³ ............................................. F16L 41/00
[52] U.S. Cl. ..................................... 285/20; 285/158; 285/200; 285/223; 285/253; 285/397
[58] Field of Search .................... 285/20, 19, 200, 223, 285/158, 253, 397; 137/571

[56] References Cited

U.S. PATENT DOCUMENTS

| 858,100 | 6/1907 | Pedersen | 285/223 X |
| 1,015,180 | 1/1912 | Heitman | 285/158 |
| 3,416,819 | 12/1968 | Day | 285/302 |
| 3,788,676 | 1/1974 | Lossie | 285/397 X |

FOREIGN PATENT DOCUMENTS

| 164398 | 8/1955 | Australia | 285/200 |
| 564855 | 11/1932 | Fed. Rep. of Germany | 285/200 |
| 2804629 | 8/1978 | Fed. Rep. of Germany | 285/253 |
| 917636 | 9/1946 | France | 285/20 |
| 322399 | 7/1957 | Switzerland | 285/223 |

Primary Examiner—Thomas F. Callaghan
Attorney, Agent, or Firm—Brisebois & Kruger

[57] ABSTRACT

A tank installation comprising a tank having at least one flexible wall arranged to rest on a rigid apertured partition, which per se does not form part of the invention. A flexible duct is joined to said wall and is intended to pass through the aperture in the partition. One end of the duct is connected to the flexible wall of the tank by a folded-over portion located inside the tank, and the other end of the duct is arranged for connection to another device that is to be placed in communication with said tank.

The other device may be a second tank which also comprises a flexible wall with a flexible duct substantially aligned with said flexible duct of said first tank, and the extremities of said two flexible ducts are joined to a rigid pipe. These two tanks may be adjacent, the flexible duct of said second tank being directed towards the inside of the second tank and the rigid pipe is located within the second tank. Alternatively, the flexible duct of the second tank may be connected to the second tank by a folded-over portion located in the second tank, the two tanks being spaced apart from each other. In another embodiment, the other device is a rigid pipe. The flexible ducts are secured to the rigid pipes by clamping collars.

6 Claims, 3 Drawing Figures

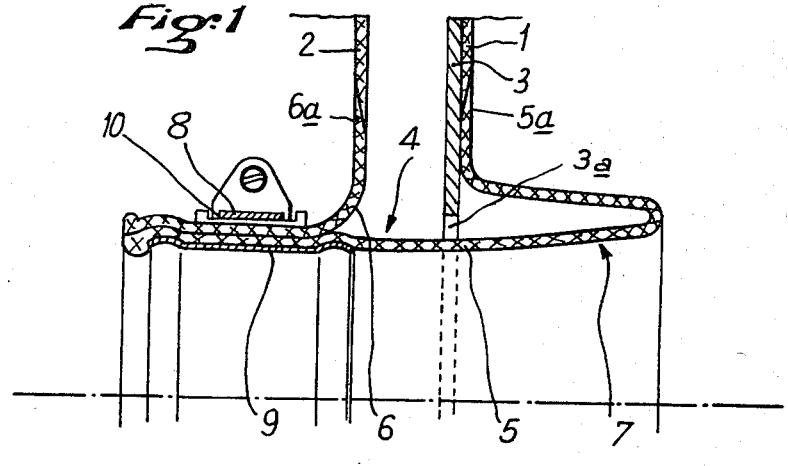
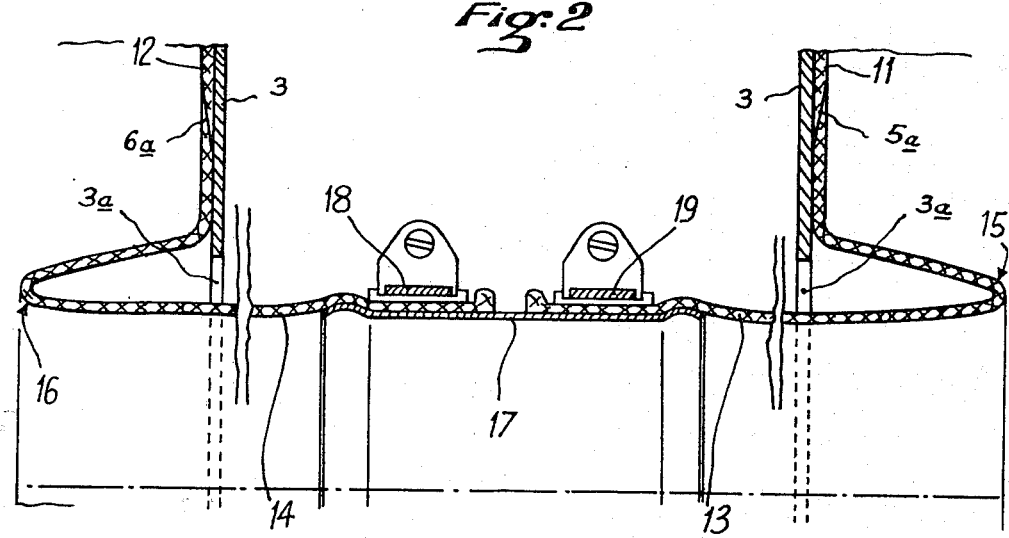
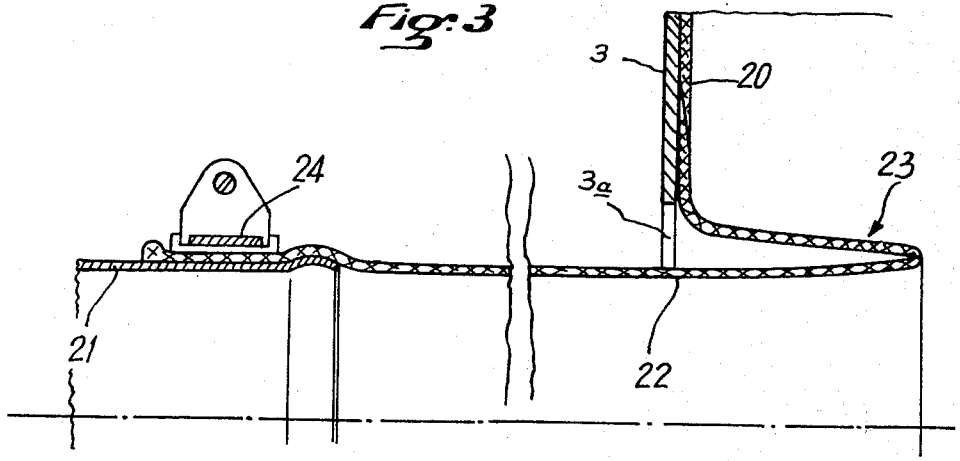

TANKS AND CONNECTING DUCTS THEREFOR

BACKGROUND OF THE INVENTION

The present invention relates to tanks and connecting ducts therefor to place the tank in communication with another tank or with a pipe.

The devices which are best known and most widely used for this purpose are simple flexible or rigid cylindrical ducts. There are cases however, in which they are inappropriate; for example some helicopters and other aircraft employ fuel tanks in pairs and these have to be interconnected by ducting and connecting devices which will prevent fracture under the action of a direct shock or of a shock causing the displacement of the tanks with respect to each other.

It is an object of the invention to provide a tank and connecting duct suitable for communication between one tank and another tank or a rigid pipe and which, without breaking, is liable to receive shocks and to allow of omnidirectional displacements of the tanks provided that these shocks and these displacements are of an intensity and amplitude, respectively, which are lower than particular limits.

SUMMARY OF THE INVENTION

Accordingly, the invention consists in a tank installation comprising a tank having at least one flexible wall arranged to rest on a rigid apertured partition, a flexible duct being joined to said wall and being intended to pass through said aperture in said partition wherein one end of said duct is connected to said flexible wall of said tank by folded-over portion located inside the tank, and the other end of said duct is arranged for connection to another device that is to be placed in communication with said tank.

BRIEF DESCRIPTION OF THE DRAWINGS

In order that the invention may be more clearly understood, reference will now be made to the accompanying drawings which illustrate three embodiments thereof by way of example and in which:

FIG. 1 is an axial half-section through a first embodiment of a two-tank installation, FIG. 2 is an axial half-section through a second embodiment of a two-tank installation and FIG. 3 is an axial half-section through a third embodiment of a tank and a rigid pipe installation.

DETAILED DESCRIPTION OF PREFERRED EMBODIMENTS

Referring now to the drawings, in the case of FIG. 1, two fuel tanks 1 and 2 of a helicopter are located comparatively close to each other. They are of an appropriate flexible material, such as a composite formed by several layers of fabrics coated with an elastomer, and they are separated from each other by a rigid apertured metal partition 3 which is part of the structure of the aircraft itself and against which the tank 1 rests; these two tanks are in communication with each other.

In order that a shock, which would otherwise be insufficiently violent to endanger the lives of the occupants, does not cause the aircraft to be immediately set on fire, any device placing the two tanks in communication must not be fractured, even if these latter are displaced or if a metal component is flung against this device.

In the embodiment of FIG. 1, this result is obtained by constructing the device 4 for establishing communication between two tanks from two substantially coaxial flexible pipes 5 and 6 which are connected to each other, and by forming the pipe 5 which is connected to the tank 1 and which extends outside this latter, with a folded-over portion 7 which is located within the tank and turned towards the inside thereof. The body of the flexible pipe 5 thus extends on either side of the rigid partition 3 which acts as a support for the flexible wall of the tank 1, whilst passing through this partition through an aperture 3a therein.

The connection between the pipes 5 and 6 is situated at a distance from the partition 1 and is freely movable, in such manner as to prevent or reduce the concentration of strains which, by forming at this point, would cause the ripping or fracturing of the device.

In the embodiment of FIG. 1, the pipe 6 which is joined to the tank 2 is placed wholly inside this latter and is directed towards its inside; the pipe 5 penetrates into the pipe 6, in such manner that the joint between the two pipes which is formed by coupling the one to the other, is situated within the tank 2. In this particular case, they are simply applied one against the other by means of a clamping collar 8 external to the pipe 6, which bears on a rigid sleeve or a metal pipe section 9 internal to the pipe 5; a flexible ring 10 is interposed between the clamping collar 8 and the pipe 6 to protect this latter and the axial end portions of the metal sleeve 9 are contoured in such manner as to cause a kind of mechanical hooking interengagement of the pipes 5 and 6.

The flexible pipes 5 and 6 are made from an appropriate elastomer and they preferably comprise a reinforcement such as a reinforcing fabric imbedded in their walls.

In the embodiment, they are shown as being a kind of extension of the wall of the tank to which they are joined, in such manner as to eliminate a joint made by superposing the walls of the tank and of the pipe with or without an auxiliary element, which would have the dual disadvantage of increasing the weight and representing a weak spot in case of a shock. For example, the pipes 5 and 6 are joined to the flexible walls of the tanks by means of bonded joints 5a and 6a between chamfered surfaces, which are well known in the rubber industry. These joints could be replaced by equivalent or disassemblable mechanical fastenings to facilitate assembling and eventual repairs.

The pipes or ducts 5 and 6 may be of the same material as that of the walls of the tanks or of a material which is different but is appropriate to convey fuels or other hydrocarbons and which has all the other mechanical qualities required, for example that of mechanical strength. These may be made and assembled at the same time as the tanks, the duct 6 then being assembled at the outside of the tank 2 and then inverted like the finger of a glove.

The ducts 5 and 6 are joined to each other when the tanks are being installed; for this installation it is possible to make use of the inspection port through which the mould had been withdrawn and removed after vulcanisation of the tank.

In case of accident, the tanks may be displaced in all directions within particular limits with respect to each other without thereby causing a break in the connection since by virtue of the folded-over portion 7, the duct 5 may lengthen axially or be deformed transversely without the strains to which it is exposed becoming greater than its mechanical strength; the same applies if the device is exposed to a direct stress, for example, as a result of the impact of a metal part.

It will be observed that in these cases the joint between the ducts 5 and 6 is unconfined, meaning that it floats and moves freely without causing the appearance of strains.

Finally, the fact of joining the two ducts simply by applying these against each other mechanically without bonding enables these to slip a little in case of need and this equally attenuates the magnitude of the shocks (otherwise possibly) causing interruption of the communication between the two tanks.

In the embodiment of FIG. 2, tanks 11 and 12 which are placed in communication, are contained in box elements positioned farther part from each other. Each is provided with a flexible duct 13, 14 analogous to the duct 5 of the embodiment of FIG. 1 and each of which passes through a partition 3 to lead outside its tank and which comprises a folded-over portion 15, 16 respectively turned towards the inside of the tank. The two ducts 13 and 14 are aligned and joined together by means of a rigid pipe 17 on which they are gripped and secured by means of clamping collars 18 and 19 at a distance from the partitions 3 and between the two tanks.

In case of a shock, the same thing occurs as in the embodiment of FIG. 1: elongation of the flexible ducts thanks to the folded-over sections, and free displacement of the joint of the ducts, the ducts slipping on the metal pipe in case of need.

In the embodiment of FIG. 3, a tank 20 is in communication with a rigid pipe 21 external thereto. A flexible duct 22 joined to the flexible wall of the tank 20, is analogous to the flexible duct 5 of the first embodiment: it comprises a folded-over portion 23 situated within the tank 20 and turned towards the inside thereof; this flexible duct 22 is secured at a distance from the partition 3 to the rigid pipe 21 being engaged and firmly secured thereon by means of a clamping collar 24.

As in the preceding embodiments, if a shock occurs, the duct 22 lengthens and enables the tank 20 and the rigid pipe 21 to undergo displacement with respect to each other, longitudinally or transversely.

In the embodiments described, the tanks may each be formed entirely by a flexible bag or may alternately be partially rigid and have at least one flexible wall to which is joined the flexible duct via its folded-over section internal to the tank. In either case, the bag or the flexible wall bears in the normal condition on a rigid wall or any other equivalent means serving the purpose of holding same in position.

I claim:

1. In a tank installation comprising a tank having at least one flexible wall which rests on a rigid apertured partition and a duct joined to said wall and passing through an aperture in said partition, the improvement that
   (a) said duct is flexible;
   (b) a folded-over end portion of said duct connects one end of said duct to said one flexible wall, said folded-over end portion being located within said tank, and
   (c) a rigid pipe member is clamped to the other end of said duct at a location on the side of said apertured portion remote from said one flexible wall, the arrangement being such that risks of rupture of the duct due to violent shocks are minimised by its ability to move relative to said one flexible wall of said tank in more than a purely axial direction.

2. An installation according to claim 1, wherein said (other device) duct is connected to a second tank which also comprises a flexible wall with a flexible duct substantially aligned with said flexible duct of said first tank, and wherein the extremities of said two flexible ducts are joined to said rigid pipe member.

3. A tank installation according to claim 2, wherein said two tanks are adjacent, said flexible duct of said second tank is directed towards the inside of said second tank and said rigid pipe member is located within said second tank.

4. A tank installation according to claim 2, wherein said flexible duct of said second tank is connected to said second tank by a folded-over portion located in said second tank, said two tanks being spaced apart from each other.

5. A tank installation according to claim 1, wherein (said other device is a rigid pipe, and) said flexible duct is secured (there) to said rigid pipe member by a clamping collar.

6. A tank installation according to claim 2, wherein said flexible ducts are connected to said rigid pipe member by clamping collars.

* * * * *